(12) United States Patent
Singh et al.

(10) Patent No.: US 8,320,478 B2
(45) Date of Patent: Nov. 27, 2012

(54) SYSTEM AND METHOD FOR GENERATING A SIGNAL WITH A RANDOM LOW PEAK TO AVERAGE POWER RATIO WAVEFORM FOR AN ORTHOGONAL FREQUENCY DIVISION MULTIPLEXING SYSTEM

(75) Inventors: Satish Singh, Noida (IN); Vijay Ahirwar, Bhopal (IN)

(73) Assignee: Entropic Communications, Inc., San Diego, CA (US)

( * ) Notice: Subject to any disclaimer, the term of this patent is extended or adjusted under 35 U.S.C. 154(b) by 732 days.

(21) Appl. No.: 12/339,249

(22) Filed: Dec. 19, 2008

(65) Prior Publication Data
US 2010/0158140 A1   Jun. 24, 2010

(51) Int. Cl.
*H04K 1/10* (2006.01)

(52) U.S. Cl. ........ 375/260; 375/299; 375/347; 375/267; 375/295

(58) Field of Classification Search .................... 375/260
See application file for complete search history.

(56) References Cited

U.S. PATENT DOCUMENTS

| | | | | |
|---|---|---|---|---|
| 6,804,307 | B1 * | 10/2004 | Popovic | 375/299 |
| 7,050,487 | B2 * | 5/2006 | Schenk | 375/219 |
| 7,835,454 | B2 * | 11/2010 | Armstrong et al. | 375/260 |
| 2002/0141437 | A1 * | 10/2002 | Meyer et al. | 370/442 |
| 2005/0152481 | A1 * | 7/2005 | Lin et al. | 375/346 |
| 2006/0078066 | A1 * | 4/2006 | Yun et al. | 375/299 |

\* cited by examiner

*Primary Examiner* — Lihong Yu

(57) ABSTRACT

A method for generating a signal with a random low peak to average power ratio waveform for an orthogonal frequency division multiplexing system involves processing a complex vector to generate a processed complex vector and performing an inverse fast Fourier transform on the processed complex vector to generate a signal with a random low peak to average power ratio waveform for an orthogonal frequency division multiplexing system.

12 Claims, 3 Drawing Sheets

SYSTEM AND METHOD FOR GENERATING A SIGNAL WITH A RANDOM LOW PEAK TO AVERAGE POWER RATIO WAVEFORM FOR AN ORTHOGONAL FREQUENCY DIVISION MULTIPLEXING SYSTEM

Embodiments of the invention relate generally to signal processing systems and methods and, more particularly, to a system and method for generating a signal with a random low peak to average power ratio (PAPR) waveform for an orthogonal frequency division multiplexing (OFDM) system.

A concern with OFDM systems is that signals with high peak to average power ratio waveforms undergo severe non-linear impairments at the OFDM transmitters. It is difficult to design linear analog components of OFDM systems when there is a large dynamic range of signals with high peak to average power ratio waveforms. Thus, there is a need for a system and method for generating a signal with a random low peak to average power ratio waveform for an OFDM system, where the signal can be used to characterize and compensate for impairments that result from imperfections in the analog components.

A method for generating a signal with a random low peak to average power ratio waveform for an OFDM system involves processing a complex vector to generate a processed complex vector and performing an inverse fast Fourier transform (IFFT) on the processed complex vector to generate the signal with the random low peak to average power ratio waveform for the OFDM system.

In an embodiment, a method for generating a signal with a random low peak to average power ratio waveform for an orthogonal frequency division multiplexing system comprises obtaining a complex vector, wherein an inverse fast Fourier transform result of the complex vector has a low peak to average power ratio real waveform, processing the complex vector to generate a processed complex vector, wherein processing the complex vector includes one of cyclically shifting the complex vector a random amount and multiplying the complex vector by an exponential function of the product of a random imaginary number and angular frequency, and performing an inverse fast Fourier transform on the processed complex vector to generate a signal with a random low peak to average power ratio waveform.

In an embodiment, a method for generating a signal with a random low peak to average power ratio waveform for an orthogonal frequency division multiplexing system comprises obtaining a complex vector and dividing the complex vector into a first vector section and a second vector section, wherein an inverse fast Fourier transform result of the complex vector has a low peak to average power ratio real waveform and the complex vector includes a plurality of elements, wherein each of the first and second vector sections includes half of the elements of the complex vector and the second vector section is the conjugate mirror of the first vector section, processing the complex vector to generate a processed complex vector, wherein processing the complex vector includes randomly cyclically shifting the first vector section and the second vector section to generate a cyclically shifted first vector section and a cyclically shifted second vector section, wherein the cyclically shifted second vector section is the conjugate mirror of the cyclically shifted first vector section, and performing an inverse fast Fourier transform on the processed complex vector to generate a signal with a random low peak to average power ratio waveform.

In an embodiment, a system for generating a signal with a random low peak to average power ratio waveform for an orthogonal frequency division multiplexing system comprises a vector processing unit and an inverse fast Fourier transforming unit. The vector processing unit is configured to randomly process a complex vector to generate a processed complex vector, wherein an inverse fast Fourier transform result of the complex vector has a low peak to average power ratio real waveform. The inverse fast Fourier transforming unit is configured to perform an inverse fast Fourier transform on the processed complex vector to generate a signal with a random low peak to average power ratio waveform.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

Figure 1:
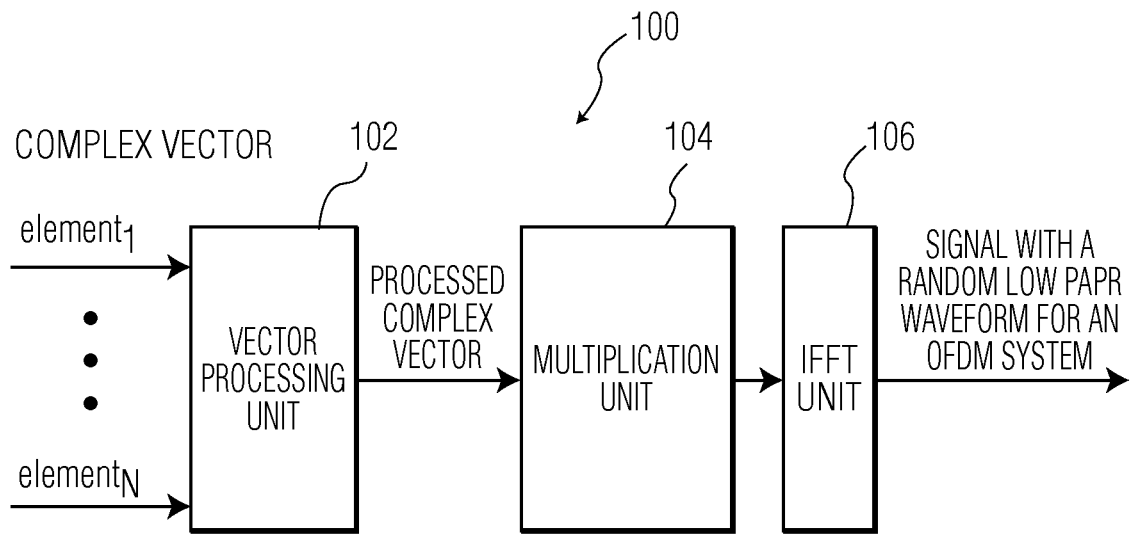
FIG. 1 depicts an embodiment of a system for generating a signal with a random low peak to average power ratio waveform for an OFDM system.

FIG. 1 depicts an embodiment of a system 100 for generating a signal with a random low peak to average power ratio waveform for an OFDM system. In the embodiment of FIG. 1, the system includes a vector processing unit 102, a multiplication unit 104, and an inverse fast Fourier transform (IFFT) unit 106. The system may be used, for example, to generate signals with low peak to average power ratio waveforms for receiver in phase signal and the quadrature phase signal (RXIQ) imbalance algorithms of Multimedia over Coax Alliance (MOCA) systems.

The vector processing unit 102 is configured to randomly process a complex vector to generate a processed complex vector, where an IFFT result of the complex vector has a low peak to average power ratio real waveform. The complex vector includes a group of elements ranging from $element_1$ to $element_N$, where N is an integer greater than one. In some embodiments, the complex vector includes two hundred fifty six elements. Each complex element is generated by digital modulation using a finite constellation, such as Binary Phase Shift Keying (BPSK) or four-level Pulse Amplitude Modulation (4PAM). The complex vector may be obtained through offline random search and stored in software, hardware, or a combination of software and hardware. The vector processing unit may be implemented in software, hardware, firmware, or a combination of software, hardware, and firmware. Three detailed embodiments of the vector processing unit are depicted as follows in FIG. 2, FIG. 3, and FIG. 4.

The multiplication unit 104 is configured to multiply the processed complex vector, $V_p$, by some predefined number to generate a multiplied processed complex vector, $V_{pm}$. The multiplication unit is optional. In some embodiments, the system does not include the multiplication unit 104 and the IFFT unit 106 is configured to perform an IFFT on the processed complex vector from the vector processing unit 102 to generate a signal with a random low peak to average power ratio real waveform. The multiplication unit may be integrated in the vector processing unit. In some embodiments, the multiplication unit is configured to multiply the processed complex vector, $V_p$, by the integer "1" to generate the multiplied processed complex vector, $V_{pm}$. In some embodiments, the multiplication unit is configured to multiply the processed complex vector, $V_p$, by the imaginary unit, j, to generate the multiplied processed complex vector, $V_{pm}$. In some embodiments, the multiplication unit is configured to multiply the processed complex vector, $V_p$, by the addition of the square root of one half and the product of the square root of one half and the imaginary unit, j, to generate the multiplied processed complex vector, $V_{pm}$. Respectively, the multiplied processed complex vector, $V_{pm}$, can be expressed as:

$$V_{pm} = V_p \times 1 \text{ or} \qquad (1)$$

$$V_{pm} = V_p \times j \text{ or} \qquad (2)$$

$$V_{pm} = V_p \times \left( \sqrt{\frac{1}{2}} + \sqrt{\frac{1}{2}} \times j \right) \qquad (3)$$

The multiplication unit may be implemented in software, hardware, firmware, or a combination of software, hardware, and firmware.

The inverse fast Fourier transform (IFFT) unit 106 is configured to perform an IFFT on the multiplied processed complex vector to generate a signal with a random low peak to average power ratio waveform. When the multiplication unit 104 is configured to multiply the processed complex vector, $V_p$, by the integer "1," the signal generated by the IFFT unit is a purely real signal. When the multiplication unit is configured to multiply the processed complex vector, $V_p$, by the imaginary unit, j, the signal generated by the IFFT unit is a purely imaginary signal. When the multiplication unit is configured to multiply the processed complex vector, $V_p$, by the addition of the square root of one half and the product of the square root of one half and the imaginary unit, j, the signal generated by the IFFT unit is a complex signal, where the in phase component is equal to the quadrature component. The IFFT unit may be implemented in software, hardware, firmware, or a combination of software, hardware, and firmware.

Figure 2:
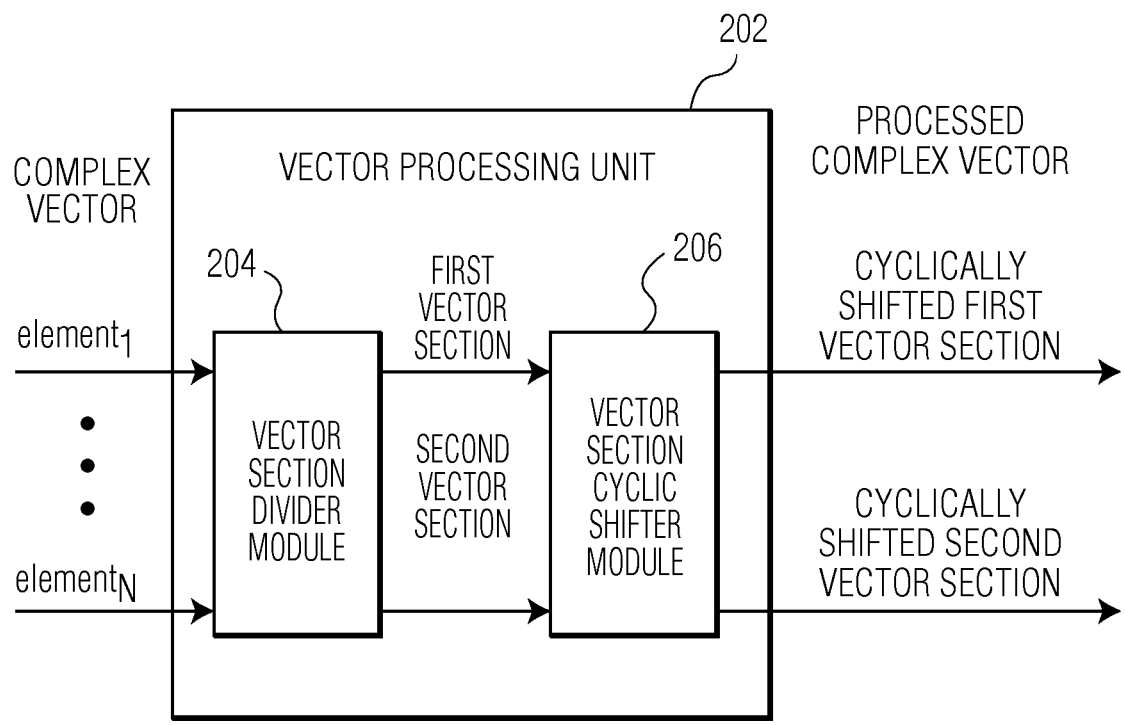
FIG. 2 depicts an embodiment of the vector processing unit of FIG. 1.

FIG. 2 depicts an embodiment of the vector processing unit 102 of FIG. 1. In the embodiment of FIG. 2, the vector processing unit 202 includes a vector section divider module 204 and a vector section cyclic shifter module 206. The vector section divider module is configured to divide the complex vector into a first vector section and a second vector section. Each of the first and second vector sections includes half of the elements of the complex vector. The second vector section is the conjugate mirror of the first vector section. The vector section cyclic shifter module is configured to randomly cyclically shift the first vector section and the second vector section to generate a cyclically shifted first vector section and a cyclically shifted second vector section, where the cyclically shifted second vector section is the conjugate mirror of the cyclically shifted first vector section. In some embodiments, the vector section cyclic shifter module is configured to cyclically shift the first vector section an amount in a direction using a linear feedback shift register to generate the cyclic shifted first vector section and to cyclically shift the second vector section in the opposite direction by the same amount to generate the cyclically shifted second vector section, where the cyclically shifted second vector section is the conjugate mirror of the cyclically shifted first vector section. By dividing the complex vector into two vector sections and cyclically shifting these two vector sections, the processed complex vector keeps the conjugate symmetry of the complex vector.

Figure 3:
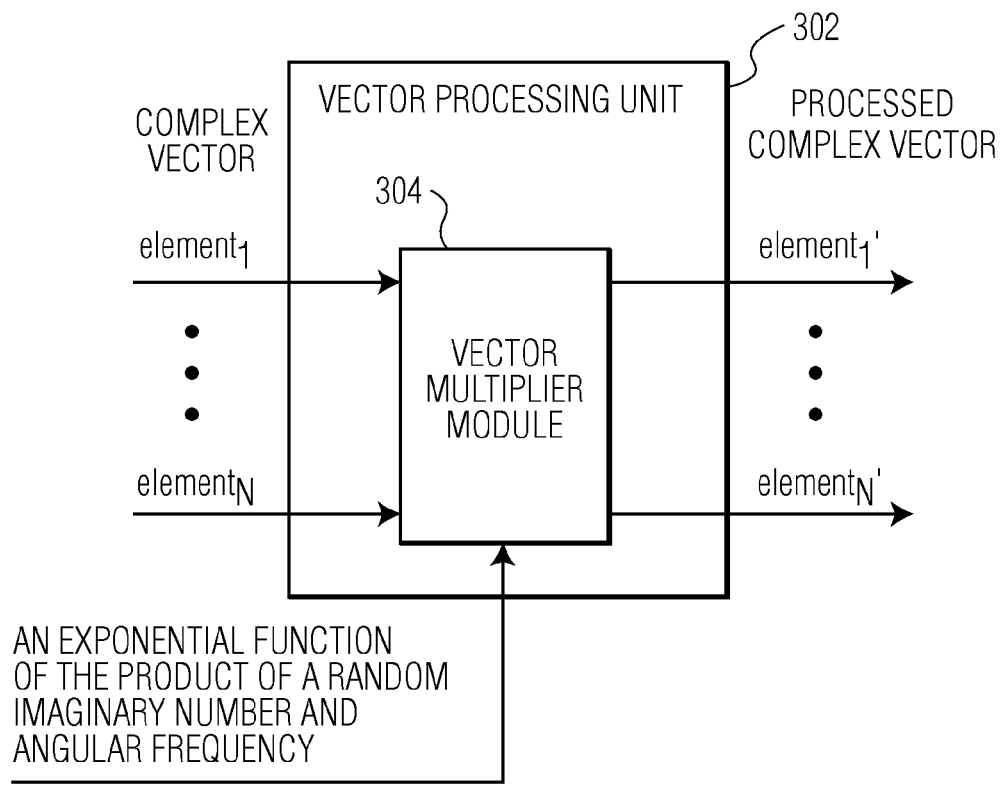
FIG. 3 depicts another embodiment of the vector processing unit of FIG. 1.

FIG. 3 depicts another embodiment of the vector processing unit 102 of FIG. 1. In the depicted embodiment of FIG. 3, the vector processing unit 302 includes a vector multiplier module 304. The vector multiplier module is configured to multiply the complex vector, V, by an exponential function of the product of a random imaginary number, R×j, where R is a random real number, which may be generated using a linear feedback shift register, and angular frequency, w, to generate the processed complex vector, $V_p$, where angular frequency, w, ranges from $2\pi \times (50 \text{ MHz}/256)*0$ to $2\pi \times (50 \text{ MHz}/256)*255$, 256 frequencies in all. The processed complex vector, $V_p$, can be expressed as:

$$V_p = V \times e^{R \times j \times w} \qquad (4)$$

The processed complex vector, $V_p$, includes a group of elements ranging from $element_1$ to $element_N$. By multiplying the complex vector in the frequency domain, the processed complex vector is correspondingly shifted in the time domain.

Figure 4:
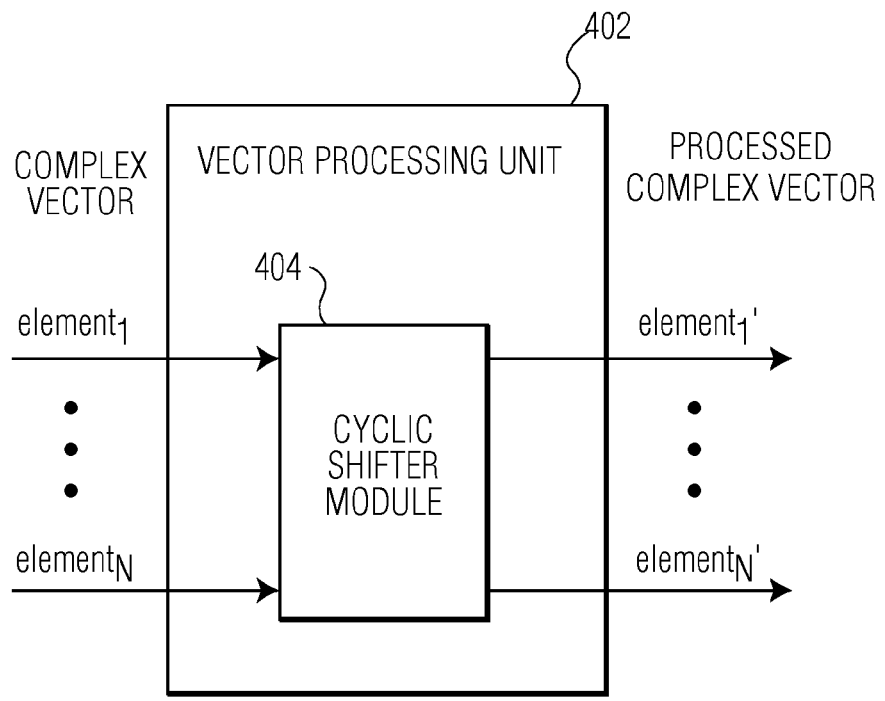
FIG. 4 depicts another embodiment of the vector processing unit of FIG. 1.

FIG. 4 depicts another embodiment of the vector processing unit 102 of FIG. 1. In the depicted embodiment of FIG. 4, the vector processing unit 402 includes a cyclic shifter module 404. The cyclic shifter module is configured to cyclically shift the complex vector a random amount. The processed complex vector includes a group of elements ranging from $element_1$ to $element_N$. As a result of the cyclically shifting, the signal with the random low peak to average power ratio waveform generated by the IFFT unit 106 includes an in phase component and a quadrature component and each of the in phase component and the quadrature component has a low random peak to average power ratio waveform. By cyclic shifting the complex vector in the frequency domain, the processed complex vector is correspondingly multiplied in time domain.

Figure 5:
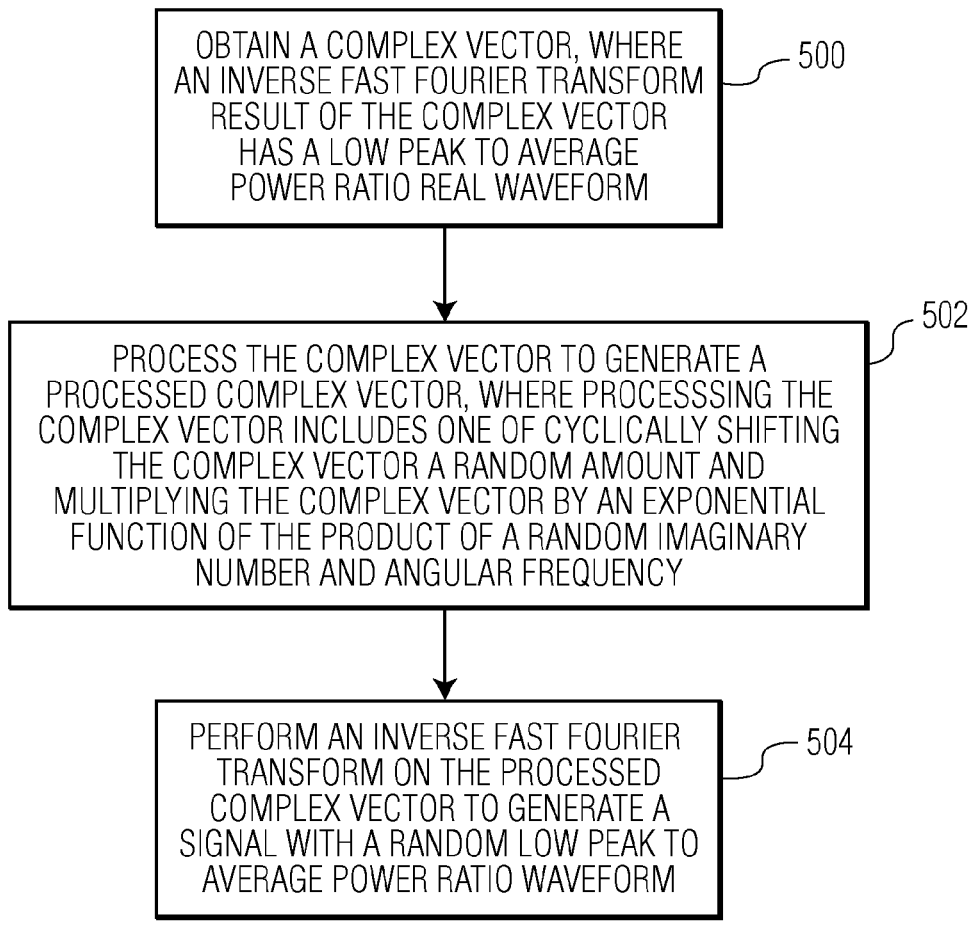
FIG. 5 is a process flow diagram of a method for generating a signal with a random low peak to average power ratio waveform for an OFDM system in accordance with an embodiment of the invention.

FIG. 5 is a process flow diagram of a method for generating a signal with a random low peak to average power ratio waveform for an OFDM system in accordance with an embodiment of the invention. At block 500, a complex vector is obtained, where an inverse fast Fourier transform result of the complex vector has a low peak to average power ratio real waveform. At block 502, the complex vector is processed to generate a processed complex vector, where processing the complex vector includes one of cyclically shifting the complex vector a random amount and multiplying the complex vector by an exponential function of the product of a random imaginary number and angular frequency. At block 504, an inverse fast Fourier transform is performed on the processed complex vector to generate a signal with a random low peak to average power ratio waveform.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention that have been described or depicted include several components described or depicted herein, other embodiments of the invention may include fewer or more components to implement less or more functionality.

Although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method of generating a signal with a random low peak to average power ratio waveform for an orthogonal frequency division multiplexing system, the method comprising:
    obtaining a complex vector, wherein an inverse fast Fourier transform result of the complex vector has a low peak to average power ratio real waveform;
    processing the complex vector to generate a processed complex vector, wherein processing the complex vector includes one of cyclically shifting the complex vector a random amount and multiplying the complex vector by an exponential function of a product of a random imaginary number and angular frequency;
    dividing the complex vector into a first vector section and a second vector section;
    cyclically shifting the first vector section an amount in a direction using a linear feedback shift register to generate the cyclically shifted first vector section;
    cyclically shift the second vector section in an opposite direction by a same amount to generate the cyclically shifted second vector section;
    wherein the complex vector includes a plurality of elements, each of the first and second vector sections including half of the elements of the complex vector, the second vector section being a conjugate mirror of the first vector section, and the cyclically shifted second vector section being a conjugate mirror of the cyclically shifted first vector section; and
    performing an inverse fast Fourier transform on the processed complex vector to generate a signal with a random low peak to average power ratio waveform of the orthogonal frequency division multiplexing system.

2. The method of claim 1, wherein processing the complex vector includes cyclically shifting the complex vector a random amount, wherein the signal with the random low peak to average power ratio waveform includes an in phase component and a quadrature component and each of the in phase component and the quadrature component has a low random peak to average power ratio waveform.

3. The method of claim 1 further comprising multiplying the complex vector by an imaginary unit before performing the inverse fast Fourier transform on the processed complex vector.

4. The method of claim 3, wherein the signal with the random low peak to average power ratio waveform is a purely imaginary signal.

5. The method of claim 1 further comprising multiplying the processed complex vector by an addition of a square root of one half and a product the addition of the square root of one half and the product of the square root of one half and an imaginary unit before performing the inverse fast Fourier transform on the processed complex vector.

6. The method of claim 5, wherein the signal with the random low peak to average power ratio waveform includes an in phase component and a quadrature component and the in phase component is equal to the quadrature component.

7. The method of claim 1, wherein the complex vector includes a plurality of elements and each element of the complex vector is generated by digital modulation using a finite constellation.

8. A system of generating a signal with a random low peak to average power ratio waveform for an orthogonal frequency division multiplexing system, the system comprising:
    a vector processing unit configured to randomly process a complex vector to generate a processed complex vector, wherein an inverse fast Fourier transform result of the complex vector has a low peak to average power ratio real waveform, the vector processing unit is configured to further divide the complex vector into a first vector section and a second vector section, to cyclically shift the first vector section an amount in a direction using a linear feedback shift register to generate the cyclically shifted first vector section, and to cyclically shift the second vector section in the opposite direction by a same amount to generate the cyclically shifted second vector section, wherein the complex vector includes a plurality of elements, each of the first and second vector sections including half of the elements of the complex vector, the second vector section being the conjugate mirror of the first vector section, and the cyclically shifted second vector section being the conjugate mirror of the cyclically shifted first vector section; and
    an inverse fast Fourier transforming unit configured to perform an inverse fast Fourier transform on the processed complex vector to generate a signal with a random low peak to average power ratio waveform of the orthogonal frequency division multiplexing system.

9. The system of claim 8, wherein the vector processing unit is configured to cyclically shift the complex vector a random amount, wherein the signal with the random low peak to average power ratio waveform includes an in phase component and a quadrature component and each of the in phase component and the quadrature component has a low random peak to average power ratio waveform.

10. The system of claim 8 further comprising a multiplication unit configured to multiply the complex vector by an imaginary unit and the signal with the random low peak to average power ratio waveform is a purely imaginary signal.

11. The system of claim 8 further comprising a multiplication unit configured to multiply the processed complex vector by an addition of the square root of one half and a product of the square root of one half and an imaginary unit, wherein the signal with the random low peak to average power ratio waveform includes an in phase component and a quadrature component and the in phase component is equal to the quadrature component.

12. The system of claim 8, wherein the complex vector includes a plurality of elements and each element of the complex vector is generated by digital modulation using a finite constellation.

* * * * *